(12) United States Patent
Akino et al.

(10) Patent No.: US 11,107,474 B2
(45) Date of Patent: Aug. 31, 2021

(54) CHARACTER INPUT DEVICE, CHARACTER INPUT METHOD, AND CHARACTER INPUT PROGRAM

(71) Applicant: OMRON Corporation, Kyoto (JP)

(72) Inventors: Yusuke Akino, Kyoto (JP); Kenichi Ukai, Kyoto (JP)

(73) Assignee: OMRON Corporation, Kyoto (JP)

( * ) Notice: Subject to any disclaimer, the term of this patent is extended or adjusted under 35 U.S.C. 154(b) by 138 days.

(21) Appl. No.: 16/278,779

(22) Filed: Feb. 19, 2019

(65) Prior Publication Data

US 2019/0272826 A1 Sep. 5, 2019

(30) Foreign Application Priority Data

Mar. 5, 2018 (JP) .............................. JP2018-038508

(51) Int. Cl.
*G10L 15/26* (2006.01)
*G10L 15/22* (2006.01)
*G06F 16/30* (2019.01)
*G06F 40/274* (2020.01)

(52) U.S. Cl.
CPC .............. *G10L 15/26* (2013.01); *G06F 16/30* (2019.01); *G06F 40/274* (2020.01); *G10L 15/22* (2013.01)

(58) Field of Classification Search
CPC ......... G10L 15/26; G10L 15/22; G06F 16/30; G06F 40/274
See application file for complete search history.

(56) References Cited

U.S. PATENT DOCUMENTS

| 5,734,749 | A | 3/1998 | Yamada et al. |
| 7,461,059 | B2 * | 12/2008 | Richardson ....... G06F 16/24534 |
| 8,249,873 | B2 * | 8/2012 | Blair ....................... G10L 15/26 704/252 |
| 8,825,484 | B2 * | 9/2014 | Yamada .................. G06F 3/167 704/260 |
| 9,799,327 | B1 * | 10/2017 | Chan ....................... G06F 40/12 |
| 10,854,181 | B2 * | 12/2020 | Joshi .................. H04M 1/72442 |
| 2002/0007275 | A1 | 1/2002 | Goto et al. |
| 2002/0184035 | A1 * | 12/2002 | Hartley ................... G10L 15/22 704/275 |
| 2007/0088549 | A1 * | 4/2007 | Mowatt .................. G10L 15/26 704/243 |

(Continued)

FOREIGN PATENT DOCUMENTS

| EP | 2816489 | A2 * | 12/2014 | .......... G06F 3/0237 |
| JP | H07-191986 | A | 7/1995 | |

(Continued)

OTHER PUBLICATIONS

Notice of Reasons for Refusal(Japanese Office Action = JPOA) dated Mar. 2, 2021 in a counterpart Japanese patent application(Japan Patent Application No. 2018-038508).

*Primary Examiner* — Mohammad K Islam
(74) *Attorney, Agent, or Firm* — Metrolex IP Law Group, PLLC

(57) ABSTRACT

A character input device includes a speech input unit that receives an input speech, a controller that detects a substitution voice included in the input speech received by the speech input unit, and generates a predictive suggestion including a part replaced with the substitution voice and corresponding to the input speech, and a suggestion output unit that outputs the predictive suggestion.

11 Claims, 4 Drawing Sheets

(56) References Cited

U.S. PATENT DOCUMENTS

| | | | |
|---|---|---|---|
| 2007/0213983 A1* | 9/2007 | Ramsey | G10L 15/22 704/254 |
| 2007/0288241 A1* | 12/2007 | Cross | G10L 15/06 704/270.1 |
| 2011/0170674 A1* | 7/2011 | Egami | G10L 25/48 379/88.14 |
| 2012/0084075 A1* | 4/2012 | Yamada | G06F 3/0237 704/9 |
| 2014/0379325 A1* | 12/2014 | Houache | G06F 40/274 704/9 |
| 2015/0003735 A1 | 1/2015 | Feng et al. | |
| 2016/0379638 A1* | 12/2016 | Basye | G10L 15/18 704/235 |
| 2017/0242832 A1* | 8/2017 | Li | G06F 40/166 |
| 2019/0043490 A1* | 2/2019 | Rivlin | G10L 15/22 |
| 2019/0378501 A1* | 12/2019 | Mithra | G10L 15/1815 |

FOREIGN PATENT DOCUMENTS

| | | |
|---|---|---|
| JP | H11-95793 A | 4/1999 |
| JP | 2000-330984 A | 11/2000 |
| JP | 2002-91492 A | 3/2002 |
| JP | 2014-164260 A | 9/2014 |

\* cited by examiner

CHARACTER INPUT DEVICE, CHARACTER INPUT METHOD, AND CHARACTER INPUT PROGRAM

CROSS-REFERENCE TO RELATED APPLICATION

This application claims priority to Japanese Patent Application No. 2018-038508 filed on Mar. 5, 2018, the contents of which are incorporated herein by reference.

FIELD

The disclosure relates to a technique for inputting characters using speech input.

BACKGROUND

Patent Literature 1 describes a technique for generating a phrase list through speech input.

CITATION LIST

Patent Literature

Patent Literature 1: Japanese Unexamined Patent Application Publication No. 2014-164260

SUMMARY

Technical Problem

However, the structure described in Patent Literature 1 converts an input speech into a string of characters, which is then output directly. In this case, the user needs to correctly pronounce characters to be input, but may sometimes forget some characters and fail to input those characters.

One or more aspects are directed to a technique for efficient speech input.

Solution to Problem

A character input device according to one or more aspects includes a speech input unit that receives an input speech, a controller that detects a substitution voice included in the input speech received by the speech input unit, and generates a predictive suggestion that includes a part replaced with the substitution voice and corresponds to the input speech, and a suggestion output unit that outputs the predictive suggestion.

This structure outputs a predictive suggestion that replaces characters generated based on a substitution voice with other characters for speech input, thus improving user convenience.

The controller included in this character input device may retrieve a predictive suggestion that completes a phrase corresponding to the input speech.

This structure outputs a predictive suggestion based on context in which a substitution voice is used.

The controller included in the character input device may display a plurality of predictive suggestions generated based on speech input data in an order of closer association with the speech input data.

This structure outputs predictive suggestions in the order of closer association with speech input data.

The character input device may include a storage to store the substitution voice that is customizable.

This structure allows customization for each user, thus improving convenience.

Advantageous Effects

The technique according to one or more aspects enables efficient speech input.

DETAILED DESCRIPTION

Embodiments will now be described with reference to the drawings.

Example Use

Figure 1:
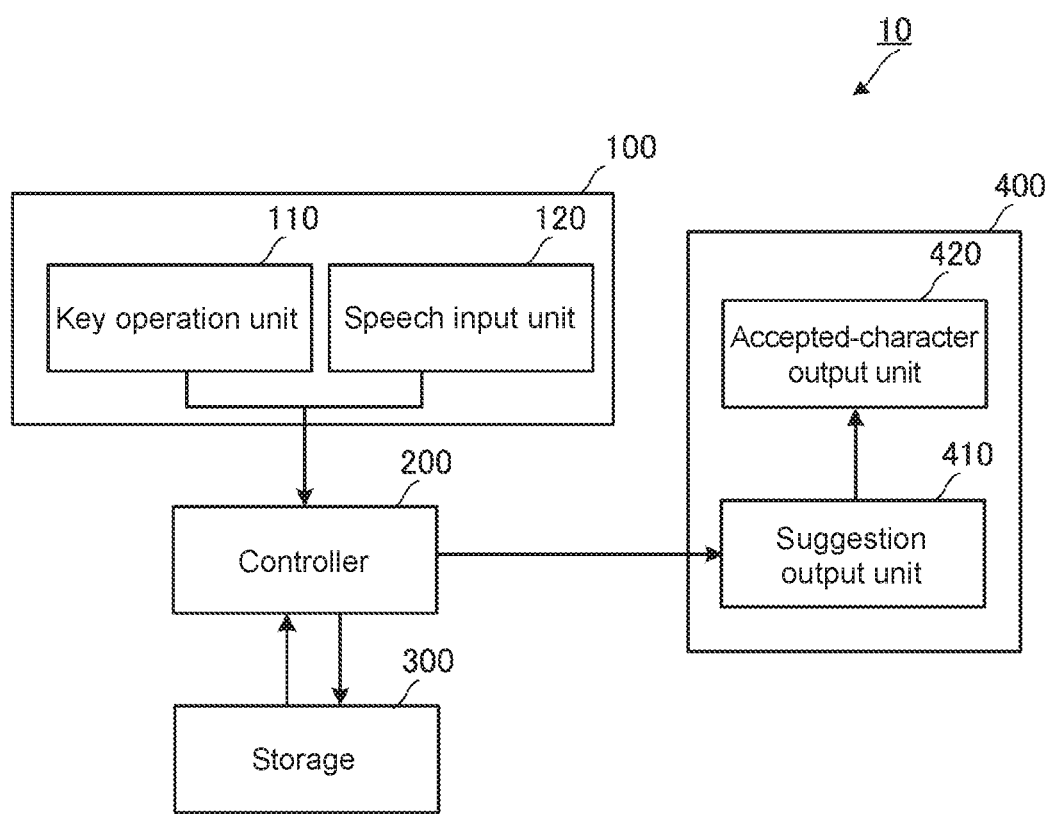
FIG. 1 is a block diagram illustrating a character input device according to a first embodiment.

An embodiment will be described first with reference to FIG. 1. FIG. 1 is a block diagram of a character input device according to a first embodiment. A character input device 10 is, for example, a smartphone, and allows a user to input characters by using the speech input function of such a mobile communication terminal.

The character input device 10 includes an operation unit 100, a controller 200, a storage 300, and an output unit 400. The operation unit 100 includes a key operation unit 110 and a speech input unit 120. The output unit 400 includes a suggestion output unit 410 and an accepted-character output unit 420. The storage 300 stores, for example, dictionary data and data such as the history of inputs from a user. The suggestion output unit 410 displays normal suggestions retrieved from the dictionary data and predictive suggestions generated based on speech data.

When the key operation unit 110 is used by the user, the operation unit 100 activates the speech input unit 120. The speech input unit 120 is used by the user for speech input.

A string of characters to be input by speech (hereafter, a speech input string) may include a substitution voice. A substitution voice, which may be a bleep, serves as a wildcard. More specifically, the user substitutes a bleep for characters that the user has forgotten or does not know during speech input.

The speech input unit 120 outputs a speech input string to the controller 200. The controller 200 determines whether the speech input string includes a substitution voice. When the speech input string includes a substitution voice, or a bleep, the controller 200 searches the storage 300 for predictive suggestions that replace the bleep to complete the phrase.

The controller 200 outputs the predictive suggestions to the suggestion output unit 410. The suggestion output unit 410 allows the user to select an intended string of characters from the suggestions, and outputs the string to the accepted-character output unit 420.

The above structure outputs predictive suggestions from the storage 300 when the user has forgotten a string of characters to be input. In other words, the above structure allows the user to input characters efficiently using speech input, thus improving user convenience.

Example Structure 1

Figure 2:
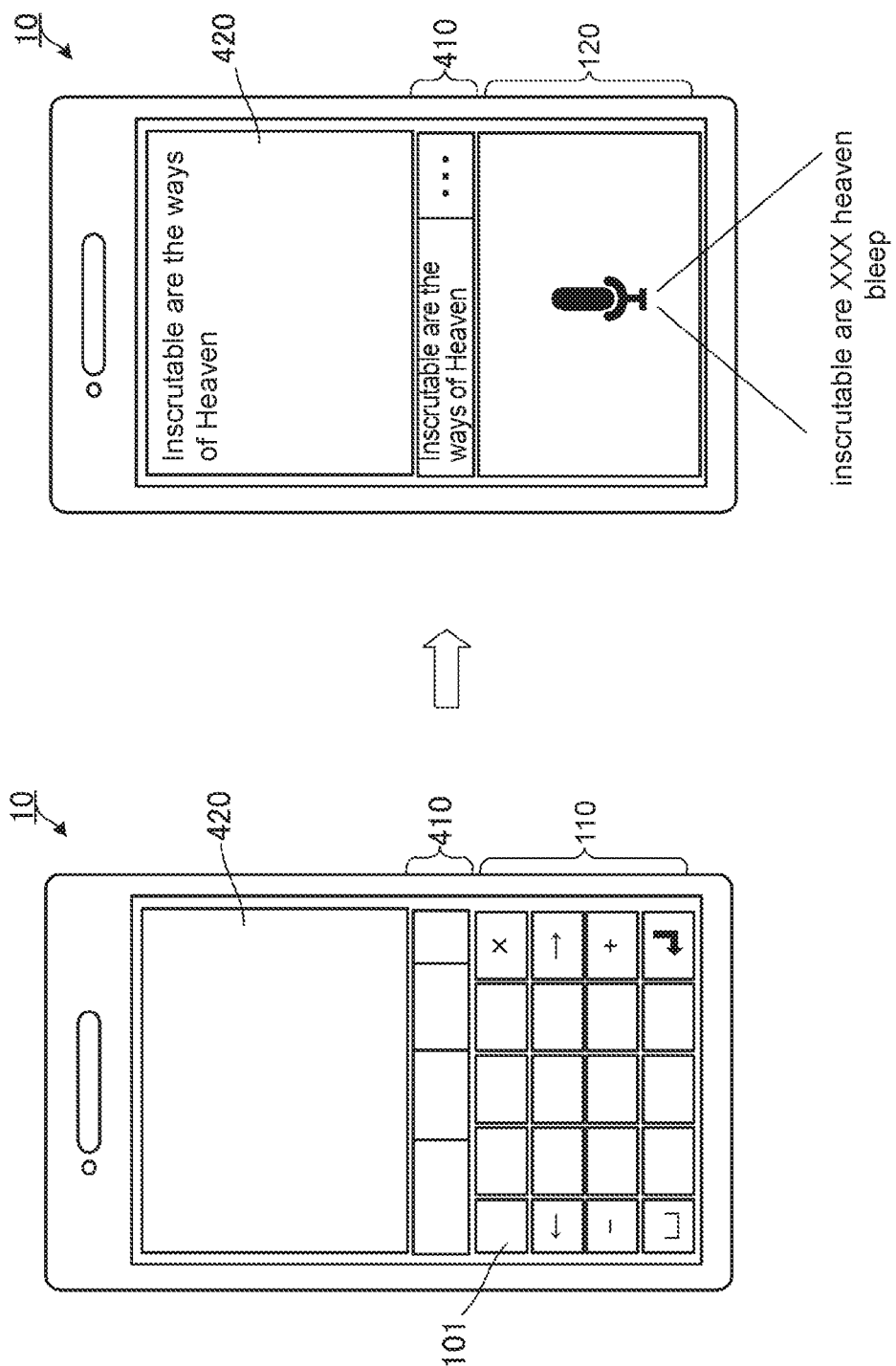
FIG. 2 is a schematic diagram illustrating a character input device according to a first embodiment.
Figure 3:
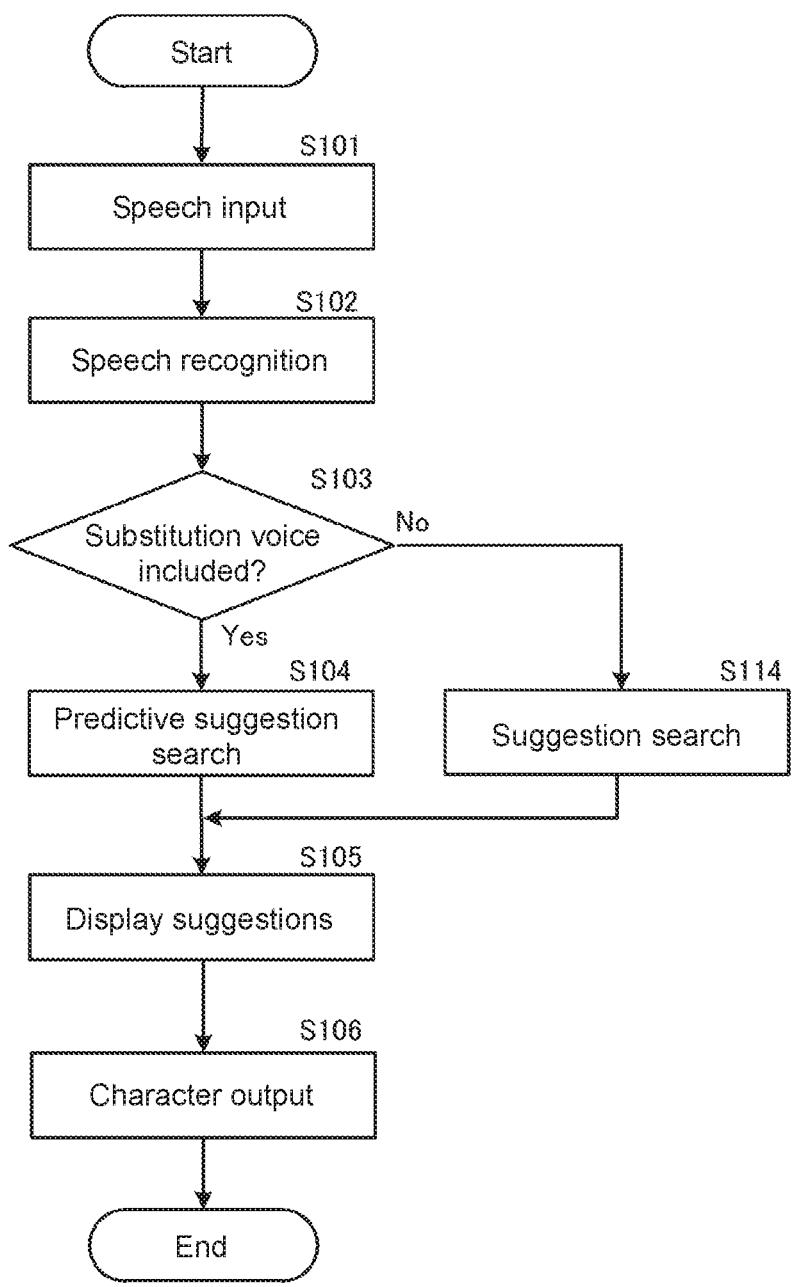
FIG. 3 is a flow diagram illustrating an operation of a character input device according to a first embodiment.

FIG. 1 is a block diagram of a character input device according to a first embodiment. FIG. 2 is a schematic diagram of the character input device according to a first embodiment. FIG. 3 is a flowchart showing the operation of the character input device according to a first embodiment.

An example structure will be described in more detail with reference to FIG. 2 based on the structure of the character input device 10 shown in FIG. 1.

As shown in FIGS. 1 and 2, the character input device 10 includes the key operation unit 110, the suggestion output unit 410, and the accepted-character output unit 420. The key operation unit 110 includes a speech input switching button 101. The speech input switching button 101 is pressed by the user to switch between the key operation unit 110 and the speech input unit 120.

When the speech input switching button 101 is pressed by the user, the operation unit 100 activates the speech input unit 120. The speech input unit 120 receives a speech including "inscrutable are," "bleep," and "heaven" from the user.

The speech input unit 120 then outputs a string of characters including "inscrutable are," "bleep," and "heaven" to the controller 200. The controller 200 detects the "bleep" used as a substitution voice in the string.

The controller 200 then searches the storage 300 for a character string that can be associated with the string "inscrutable are bleep heaven" using the "bleep" as a wildcard. More specifically, the controller 200 searches the storage 300 for a predictive suggestion that replaces the "bleep" to complete the phrase. Thus, the controller 200 outputs a search result such as "Inscrutable are the ways of Heaven." to the suggestion output unit 410.

When the user selects the result "Inscrutable are the ways of Heaven," the suggestion output unit 410 can output the intended string "Inscrutable are the ways of Heaven" to the accepted-character output unit 420.

An operation for enabling speech input using a substitution voice will be described in detail with reference to FIG. 3. FIG. 3 is a flowchart showing the operation of the character input device according to a first embodiment.

The speech input unit 120 receives speech input (S101).
The controller 200 recognizes the input speech (S102).
The controller 200 determines whether the speech input string includes a substitution voice (S103).

When the speech input string includes a substitution voice (Yes in S103), the controller 200 searches the storage 300 for predictive suggestions, and outputs the suggestions to the suggestion output unit 410 (S104).

The suggestion output unit 410 displays the predictive suggestions (S105).

When the user selects an intended string of characters from the predictive suggestions, the suggestion output unit 410 outputs the string to the accepted-character output unit 420 (S106).

When the speech input string includes no substitution voice (No in S103), the controller 200 searches the storage 300 for suggestions, and outputs the suggestions to the suggestion output unit 410 (S114).

The suggestion output unit 410 displays the suggestions (S105).

When the user selects an intended string of characters from the suggestions, the suggestion output unit 410 outputs the string to the accepted-character output unit 420 (S106).

The above structure can search the storage 300 using a substitution voice included in an input string as a wildcard. In other words, the structure can retrieve predictive suggestions, and output the suggestions including a string of characters intended by the user.

Although the above example structure uses a speech input string including a single substitution voice, the same processing as in the example can be performed for a speech input string including multiple substitution voices.

Further, for example, a substitution voice can be used to replace a speech not to be heard by other people during speech input, thus protecting the user's privacy and enabling efficient character input.

A substitution voice is customizable by the user, and can be stored in the storage 300. This further improves user convenience.

Example Structure 2

Figure 4:
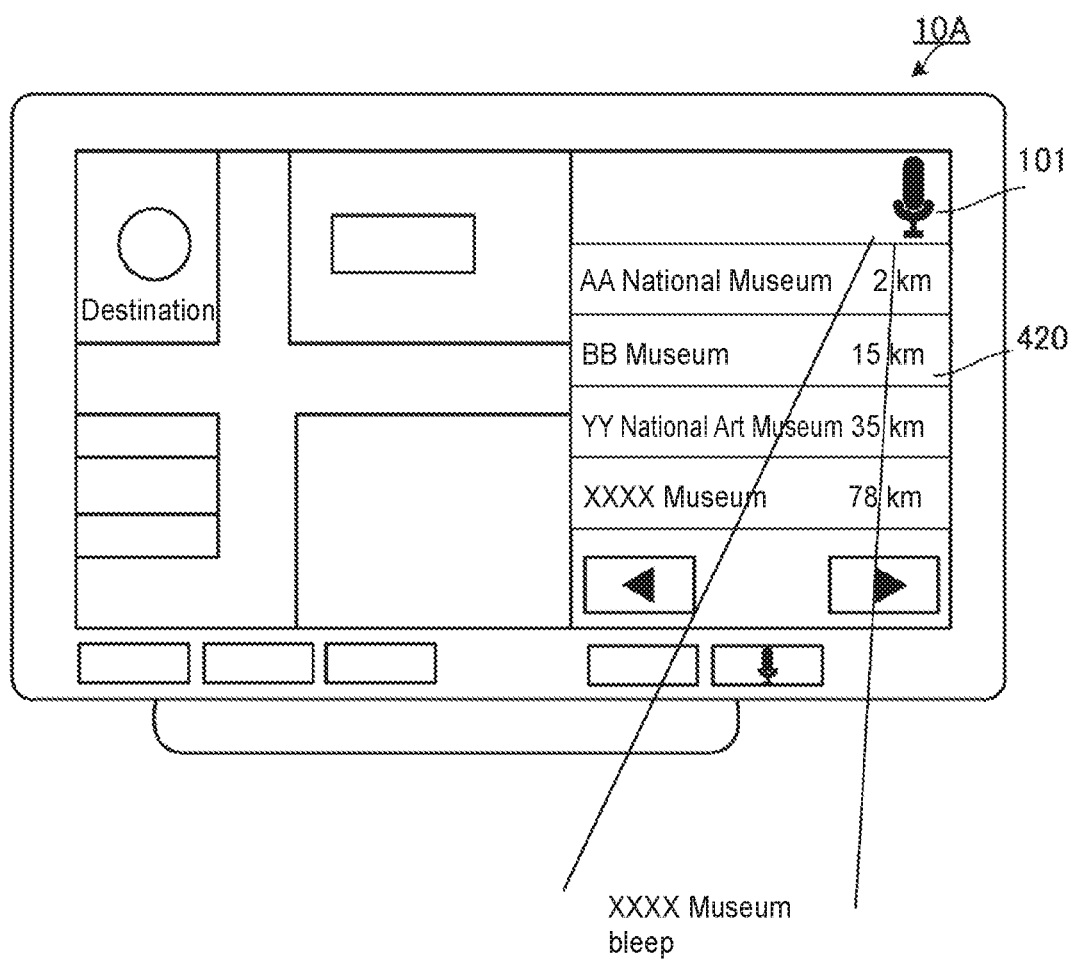
FIG. 4 is a schematic diagram illustrating a character input device according to a second embodiment.

A specific structure of a character input device according to an embodiment will now be described with reference to FIG. 4. FIG. 4 is a schematic diagram of a character input device according to a second embodiment.

A character input device 10A according to a second embodiment is included in a car navigation system. The character input device 10A according to a second embodiment has the same basic structure as in a first embodiment, which will not be described.

As shown in FIG. 4, when the speech input switching button 101 is pressed by the user, the character input device 10A activates the speech input unit 120. The speech input unit 120 receives a speech including "bleep" and "museum" from the user.

The speech input unit 120 then outputs a string of characters including "bleep" and "museum" to the controller 200. The controller 200 detects the "bleep" used as a substitution voice in the string.

The controller 200 then searches the storage 300 for strings of characters that can be associated with the string "bleep museum" using the "bleep" as a wildcard. The controller 200 retrieves strings of characters that are closely associated with character strings previously input by the user, or searches the dictionary data.

Thus, the controller 200 outputs search results such as "AA National Museum" and "BB Museum" to the suggestion output unit 410. The user may select "AA National Museum" to start the navigation.

The above structure with the character input device 10A included in a car navigation system also receives a string of characters including a substitution voice, and predicts the part replaced with the substitution voice. Thus, the structure can output suggestions including a string of characters intended by the user.

In embodiments described above, a string of characters is output when a suggestion or a predictive suggestion displayed on the suggestion output unit 410 is selected. However, a suggestion or a predictive suggestion that is associated most closely with an input speech may be displayed without being displayed on the suggestion output unit 410.

The invention claimed is:
1. A character input device, comprising:
a speech input unit receiving an input speech;
a controller detecting a substitution voice included in the input speech received by the speech input unit, and generating predictive suggestions for a part of the input speech replaced with the substitution voice, the predictive suggestions contextually corresponding to the input speech; and a suggestion output unit outputting the predictive suggestions for selection, wherein
the substitution voice comprises a user-selected wildcard intended to substitute for the part of the input speech for which the predictive suggestions are generated,
the user-selected wildcard causes the controller to generate the predictive suggestions from which a replacement character string is selected,
the user-selected wildcard prevents speech corresponding to the replacement character string from being overheard during the input speech, and
the user-selected wildcard comprises a predetermined spoken word, phrase, or sound that is a contextually distinguishable substitute for the speech corresponding to the replacement character string.

2. The character input device according to claim 1, wherein the predictive suggestions complete a phrase corresponding to the input speech.

3. The character input device according to claim 1, wherein the controller displays the generated predictive suggestions in an order of closer association with the input speech.

4. The character input device according to claim 1, further comprising:
a storage storing the substitution voice, wherein
the substitution voice is customizable.

5. The character input device according to claim 2, wherein the controller displays the generated predictive suggestions in an order of closer association with the input speech.

6. The character input device according to claim 2, further comprising:
a storage storing the substitution voice, wherein
the substitution voice is customizable.

7. The character input device according to claim 3, further comprising:
a storage storing the substitution voice, wherein
the substitution voice is customizable.

8. A character input method implemented by a computer, the method comprising:
receiving an input speech;
detecting a substitution voice included in the input speech and generating predictive suggestions for a part of the input speech replaced with the substitution voice, the predictive suggestions contextually corresponding to the input speech; and
outputting the predictive suggestions for selection, wherein
the substitution voice comprises a user-selected wildcard intended to substitute for the part of the input speech for which the predictive suggestions are generated,
the user-selected wildcard causes the controller to generate the predictive suggestions from which a replacement character string is selected
the user-selected wildcard prevents speech corresponding to the replacement character string from being overheard during the input speech, and
the user-selected wildcard comprises a predetermined spoken word, phrase, or sound that is a contextually distinguishable substitute for the speech corresponding to the replacement character string.

9. A non-transitory computer-readable storage medium storing a character input program, which when read and executed, causes a computer to perform operations comprising:
receiving an input speech;
detecting a substitution voice included in the input speech and generating predictive suggestions for a part of the input speech replaced with the substitution voice, the predictive suggestions contextually corresponding to the input speech; and
outputting the predictive suggestions for selection, wherein
the substitution voice comprises a user-selected wildcard intended to substitute for the part of the input speech for which the predictive suggestions are generated,
the user-selected wildcard causes the controller to generate the predictive suggestions from which a replacement character string is selected
the user-selected wildcard prevents speech corresponding to the replacement character string from being overheard during the input speech, and
the user-selected wildcard comprises a predetermined spoken word, phrase, or sound that is a contextually distinguishable substitute for the speech corresponding to the replacement character string.

10. The character input method according to claim 8, wherein the predictive suggestions complete a phrase corresponding to the input speech.

11. The character input method according to claim 10, further comprising the predictive suggestions in an order of closer association with the input speech.

* * * * *